Figure 1:
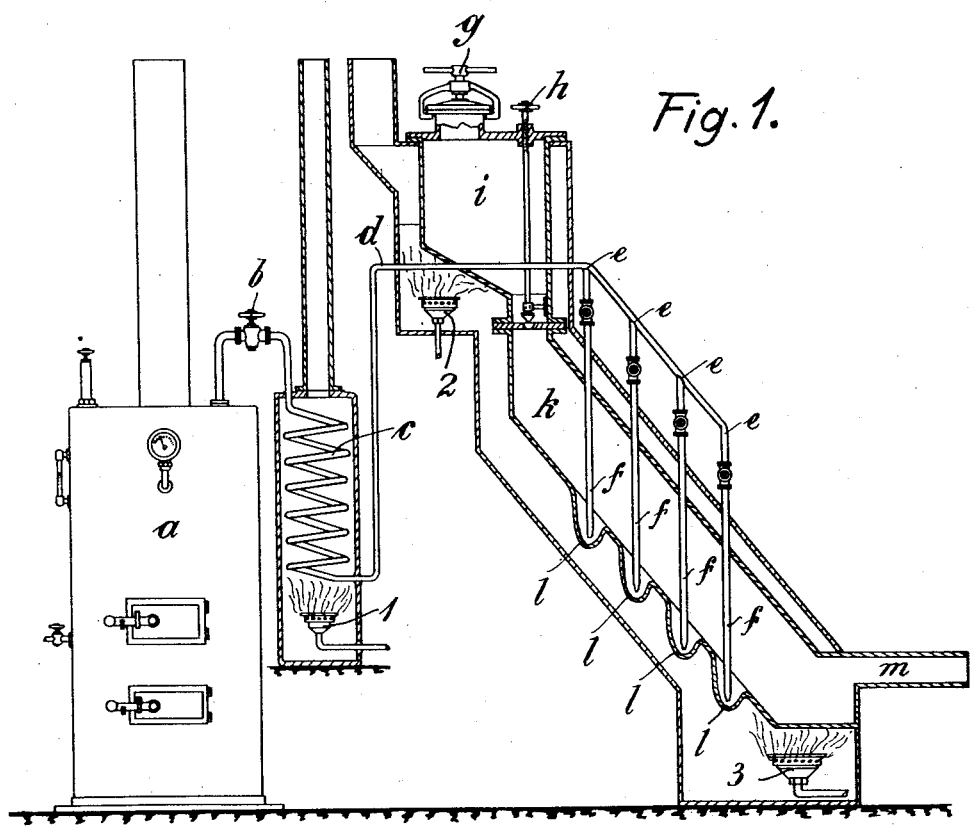

July 25, 1933.  G. RUPPRECHT  1,919,307
METHOD AND APPARATUS FOR VOLATILIZING SULPHUR
Filed June 11, 1931  2 Sheets-Sheet 2
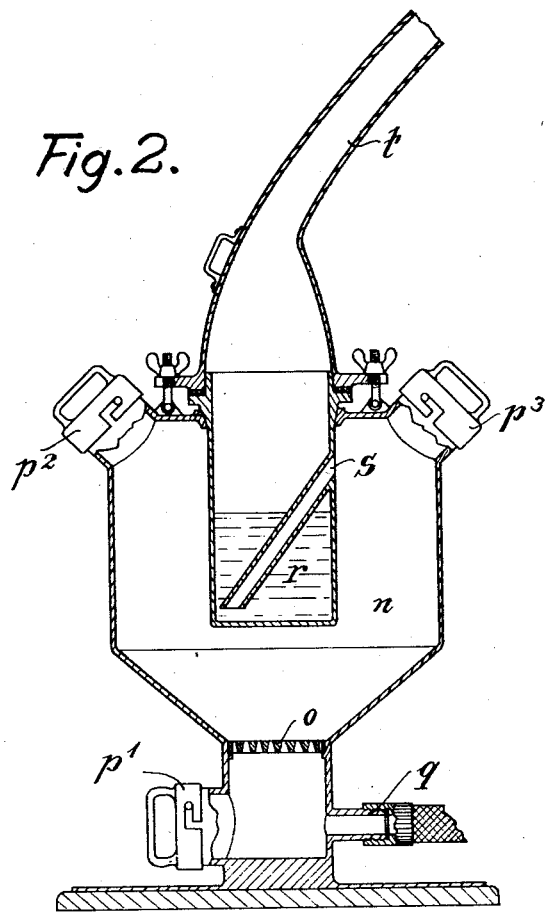
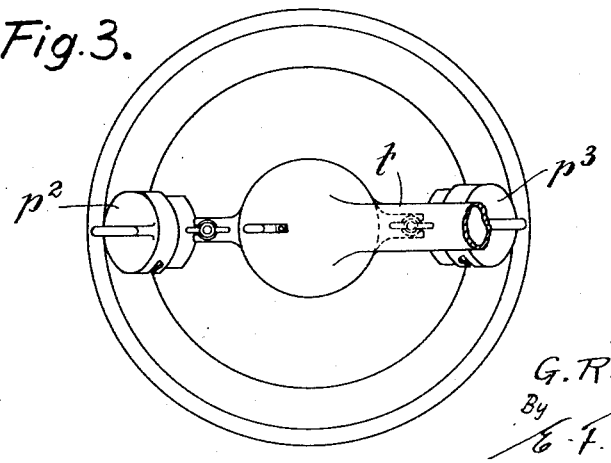
Inventor:
G. Rupprecht
By E. F. Wenderoth
Attorney Patented July 25, 1933

1,919,307

UNITED STATES PATENT OFFICE

GEORG RUPPRECHT, OF HAMBURG, GERMANY

METHOD AND APPARATUS FOR VOLATILIZING SULPHUR

Application filed June 11, 1931, Serial No. 543,669, and in Germany March 31, 1931.

The present invention relates to a method and apparatus for volatilizing sulphur.

The use of sulphur vapours offers considerable advantages in combating the spread of disease on plant life due to fungi or parasites as sulphur from sulphur vapour separates out in a very finely subdivided state and acts accordingly very much more energetically. The condensed sulphur particles adhere to the plants or trees so firmly that they cannot be washed off by rain, because from the vapour-phase they condense into the plastic adhesive modification. As the sulphur particles are not lost and are deposited on all parts a surprising fungicide effect is thereby obtained with sulphur vapours which considerably exceeds that obtained from sulphur in the form of powder. Moreover sulphur vapours have been found very useful for spraying e. g. as a protection against night frosts or the like.

It has been found that in distilling sulphur only a comparatively small quantity of concentrated sulphur vapours insufficient for treatment of large surfaces can be obtained, from a blower. This disadvantage could be avoided by forcing the sulphur vapour from the blower by means of inert gases such as carbon dioxide, nitrogen or the like or steam and there would be thus obtained a large generation of sulphur vapour.

It was however found that this hitherto known method of vaporizing sulphur could not be carried out on a large scale. The other methods used in the distillation of liquids, for example aqueous liquids or the like, for increasing the evaporation by increasing the evaporative surface and the like could not be used for the production of sulphur in vapour form on account of the known physical properties of sulphur of ignition at 220° and of boiling at 450° C. The formation of sulphur dioxide consequent for example on the ignition of the sulphur vapour had for the purposes mentioned however under all circumstances to be avoided. Sulphur dioxide has a very serious deleterious effect on plants as is known, apart from the objection on the ground of the regulations applying to a discharge of smoke gases containing sulphur dioxide into the atmosphere.

For all these reasons it was not possible for a long time to utilize the known method and apparatus on a large scale in spite of the great need on the part of agriculturists for a device which would permit the sulphur treatment of large surfaces of land.

It has now been found that the production of sulphur vapour for combating fungi or microbes or the nebulation in accordance with the invention can be carried out on a large scale by leading molten sulphur through a chamber closed from the outer air over superheated surfaces so that the sulphur can vaporize and introducing at the same time inert gases for example carbon-dioxide, nitrogen or the like, or steam to force out the sulphur vapours formed.

The invention is concerned also with apparatus for performance of this method which consists of a melting or superheating vessel for the sulphur to which is connected an evaporating chamber having a large evaporating surface which has for example inclined evaporating surfaces over which the sulphur runs, the evaporating surfaces being arranged in step-like formation, so as to form within the steps collectors for the sulphur flowing downward, into which collectors extend tubes for the introduction of the inert gases. The sulphur can also be brought direct into the evaporating vessel having a large surface. It has moreover been found that the sulphur vapour which is very light can be rendered heavier or weighted by mixing smoke gases with the sulphur vapour in lieu of pure inert gases or supplying smoke gases separately to the sulphur vapours; moreover inert gas-mixtures for example an air-carbon-dioxide mixture may be used. While pure sulphur vapour is easily driven away by wind, it is possible in accordance with the invention to treat large surfaces without difficulty by sulphur vapour-smoke-mixtures.

It has moreover been ascertained that the method and apparatus for producing the sulphur vapour in accordance with the invention can be simplified by using the heating medium for the evaporation of the sulphur also for the production of the sulphur vapours. For this purpose the combustion gases obtained from the heating medium for the evaporation of the sulphur can be led through the boiling sulphur but if these combustion gases contain smoke they serve also for weighting the sulphur vapours.

Two embodiments of the invention are illustrated by way of example in the accompanying drawings in which Fig. 1 shows one embodiment of apparatus in accordance with the invention having a large evaporating surface. Fig. 2 illustrates a second embodiment showing an apparatus in which the heating medium at the same time provides the inert gases intended to drive off the sulphur vapours. Fig. 3 is a plan view of Fig. 2.

Referring to Fig. 1, $i$ indicates the melting vessel which is suitably provided with thermometer branches and charging openings and with an outlet branch fitted with a valve $h$. Stick sulphur or broken sulphur is melted in the vessel, the molten sulphur running through the outlet branch fitted with the valve $h$ into an evaporating chamber $k$, in the embodiment shown in the drawings, over inclined heated surfaces which are interrupted after the manner of steps by pocket-like collectors $l$. The installation is heated by the burners 2 and 3 or from another suitable source of heat.

Into the pockets or collectors $l$ extend tubes $e$ with their nozzle shaped ends $f$ through which inert gases such as carbon dioxide, nitrogen or the like or steam regulated by valves can be passed through the liquid sulphur. These gases serve to drive off the sulphur evaporated which escapes at $m$ in yellow clouds.

According to the drawings steam generated in a boiler $a$ is led through a pipe fitted with a valve $b$ into superheater $c$ and preferably heated to above 450° C., the boiling point of sulphur. The superheated steam is led thence through the steam main $d$ into the steam pipes $e$ fitted with the nozzles $f$.

The evaporating chamber $k$ is completely shut off from the outer atmosphere so that no oxygen can enter and consequently no sulphur-dioxide can be formed due to ignition of the vaporized sulphur. The means for heating the sulphur superheating chamber $k$ is so constructed that the sulphur heated over a large surface and driven off becomes increasingly hotter and shortly before reaching the outlet pipe $m$ passes into the hottest zone.

The invention is not limited to the arrangement illustrated in the drawings.

The sulphur superheating chamber $k$ can be heated not only as shown in the drawings by separate petroleum, petrol, spirit, oil and like burners but the furnace chamber surrounding the sulphur superheating chamber $k$ may be heated with charcoal, peat or the like. In both cases as much air may be forced through the closed furnace chamber as is necessary for maintaining the combustion of the fuel employed. Waste gases thereby produced are almost free from oxygen due to combustion and in any case are so poor in oxygen that they cannot ignite superheated sulphur. These combustion gases can therefore be blown through the nozzles $f$ in lieu of superheated steam.

The vaporization of the liquid sulphur can also be effected in other suitable apparatus, for example in towers provided with evaporating surfaces, drums, rotating or moving evaporative surfaces and the like. It is essential for the invention that the outer air should be completely excluded, that the superheating should be effected by suitable large surfaces and the sulphur vapours should be driven off by suitable inert gases which are preferably introduced into the collectors or pockets containing liquid sulphur.

Figs. 2 and 3 illustrate another embodiment of vaporizing apparatus in accordance with the invention.

As shown, this apparatus consists of a receptacle or vessel with a heating chamber $n$ and a grate $o$ for solid fuel. Beneath the grate is disposed a blast pipe $q$ and pipe $p^1$. The heating chamber is formed at its upper side with two outlet openings $p^2$, $p^3$ which can be closed and with a central opening in which a sulphur vessel $r$ can be inserted. The sulphur vessel $r$ has on its lateral wall an opening through which a tube $s$ extends to about the bottom of the vessel $r$. The sulphur vessel $r$ can be closed on its upper side by a cap $t$ which leads the sulphur vapours into the atmosphere.

In operation the chamber $n$ is fired with a suitable fuel for example, coal, coke, peat, wood charcoal or the like. The fuel is ignited and allowed to burn with the branches $p^1$, $p^2$, $p^3$ open. Then the lower branch $p^1$ is closed and air blown in through the pipe $q$. This flow of air may be produced by a blower, fan, compressor, bellows, or the like. The combustion products escape through the outlets $p^2$, $p^3$ into the atmosphere.

When the fuel is sufficiently hot the sulphur vessel $r$ charged with sulphur is inserted in the central opening of the heating chamber $n$ and the sulphur melted by the heat of the fuel. As soon as the heat is sufficiently strong and the sulphur in the vessel $r$ sufficiently hot the two other outlets $p^2$, $p^3$ are closed. The combustion products which are practically free from oxygen must now flow from the chamber $n$ through the tube $s$ into the sulphur vessel $r$ through the molten evaporating sulphur through the tube and carry the sulphur vapour produced through the outlet pipe $t$ to the atmosphere into which the vapours escape in the form of a dense cloud.

If smoke generating means for example rags saturated with oil, decayed wood, chemical smoke-producing materials or the like are added to the heating medium, the smoke gases produced with the inert gas have a weighting effect on the sulphur vapours and ensure that the latter will be not so easily driven off in the open air.

In lieu of solid fuels liquid fuels or heating gases may be employed. The combustion air gives up its oxygen to the fuel in the combustion zone so that gas practically free from oxygen flows through the vessel *r* and will not form sulphur dioxide.

For special purposes there may be used as the inert conveying gas the compressed gas produced by fireworks, the smoke produced being used at the same time as a weighing material.

The invention is not limited to the construction described and illustrated. The apparatus may have any other form and arrangement. The new apparatus in accordance with the invention has been found very satisfactory in combating vegetable fungi and parasites etc. They provide a convenient, light and simple construction and can be easily operated by an unskilled person—a matter of great importance for agriculture, horticulture and so on. The new apparatus requires little attention and the operating costs are very low. The nebulating apparatus is suitable for spraying large surfaces for all purposes, for example for the protection of plants against night frosts and the like.

Having now particularly described and ascertained the nature of my said invention and in what manner the same is to be performed, I declare that what I claim is:

1. A method of nebulizing sulphur, comprising leading molten sulphur, heated to approximately its boiling point, through a heating chamber from which atmospheric air is excluded, passing said molten sulphur while in said heater chamber over heated evaporating surfaces of large surface area, superheating the sulphur on said surfaces, and simultaneously introducing inert gases into the said molten sulphur in sufficient quantity to drive off the sulphur vapors in a product comprising highly diluted sulphur vapors.

2. A method of nebulizing sulphur, comprising melting sulphur, leading the molten sulphur, heated at a temperature no less than its boiling point, over the heated evaporating surfaces of large surface area of a vaporizing chamber, superheating the sulphur on said surfaces, excluding the atmospheric air during said process, and introducing gases substantially inert to the sulphur into the said molten sulphur for driving off the sulphur vapors thus formed.

3. A method of nebulizing sulphur, comprising melting sulphur, leading the molten sulphur, heated at a temperature no less than its boiling point, over the heated evaporating surfaces of large surface area of a vaporizing chamber, excluding the atmospheric air during said process, superheating gases substantially inert to the sulphur to a temperature no less than the boiling point of the sulphur, and introducing the superheated gases into the molten sulphur to drive off the sulphur vapors.

4. A method of nebulizing sulphur in an evaporator having heated evaporating surfaces of large surface area disposed in step like manner and provided with pocket-like collectors, comprising melting the sulphur, heating the sulphur on the said evaporating surface to a temperature greater than its boiling point, collecting the molten sulphur in the said collectors, and forcing gases substantially inert to the sulphur into the pockets containing the sulphur for driving off the sulphur vapors.

5. A method of nebulizing sulphur in an evaporator having heated evaporating surfaces of large surface area disposed in step like manner and provided with pocket-like collectors, comprising melting the sulphur, heating the sulphur on the said evaporating surface to a temperature greater than its boiling point, collecting the molten sulphur in the said collectors, superheating gases substantially inert to the sulphur to a temperature greater than the melting point of the sulphur, and forcing the superheated gases into the collectors containing the molten sulphur, for driving off the sulphur vapors.

6. Apparatus for nebulizing sulphur, comprising a hermetically sealed chamber from which the air is excluded, a melting vessel to which the said chamber is connected, means defining inclined evaporating surfaces in the said vessel, the said surfaces being disposed in step like manner, and having pocket-like collectors for excess sulphur, pipes leading into the said pockets for the introduction of gases substantially inert to the sulphur and an outlet for the sulphur vapor, the superheated sulphur moving into increasing heated zones and leaving the apparatus at the hottest zone.

7. Apparatus for nebulizing sulphur, comprising a combustion container, for superheating the sulphur to a temperature above its boiling point, a vessel inserted therein for containing the sulphur to be heated, and a tube leading from the upper wall of said vessel, where it communicates with said container, to the bottom, through which tube the products of combustion of the heating medium are passed from the container, through and into the superheated mass of sulphur, so that the said products of combustion drive off the sulphur vapors thus formed.

8. A method of nebulizing sulphur, comprising passing the products of combustion of a fuel about the exterior of a container of sulphur, for liquefying said sulphur, and thereafter passing the products of combustion interiorly of said container, downwardly through and into the liquid sulphur, for driving off the sulphur vapors thus formed.

9. A method of nebulizing sulphur, comprising producing products of combustion by the burning of fuel, passing the products of combustion about the exterior of a container of sulphur, for liquefying the sulphur therein, and for heating the sulphur to a temperature above its boiling point, and thereafter passing the products of combustion interiorly of said container, through the said sulphur, to drive off the sulphur vapors thus formed.

10. A method of nebulizing sulphur, comprising burning fuel in a furnace, maintaining a strong draft until a good flame is secured, diminishing the draft and placing a container of sulphur in the combustion chamber of said furnace, passing the products of combustion exteriorly of said container to heat the sulphur to above its vaporizing point, and then closing the draft through the combustion chamber and then passing the products of combustion in the substantial abscence of oxygen through the sulphur in the interior of the container, thereby driving off the vaporized sulphur.

GEORG RUPPRECHT.